July 18, 1944.   W. A. RAY   2,353,759
FLUID CONTROL VALVE
Filed Sept. 26, 1941   2 Sheets-Sheet 1

Inventor,
WILLIAM A. RAY
By
John H. Rouse,
Attorney

July 18, 1944.   W. A. RAY   2,353,759
FLUID CONTROL VALVE
Filed Sept. 26, 1941   2 Sheets-Sheet 2
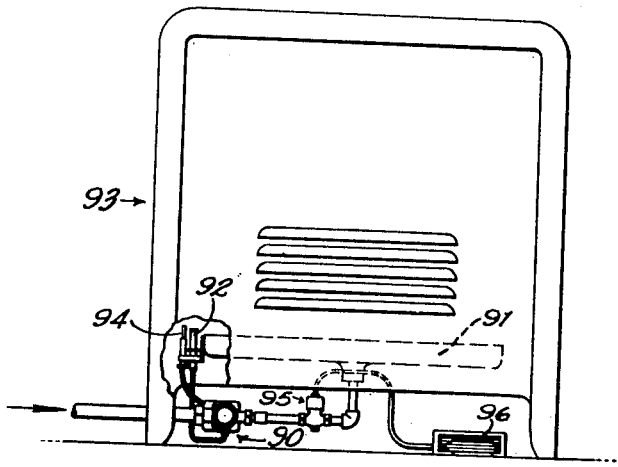
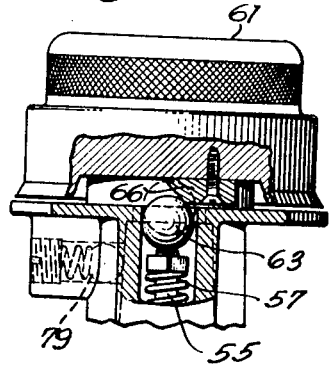
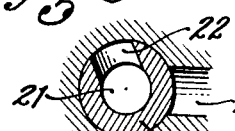
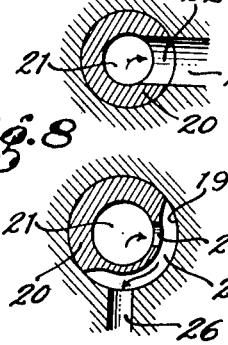
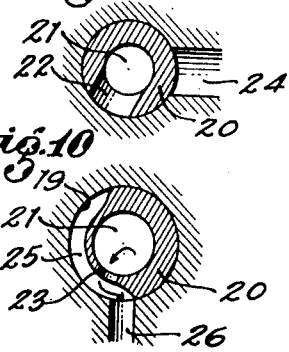
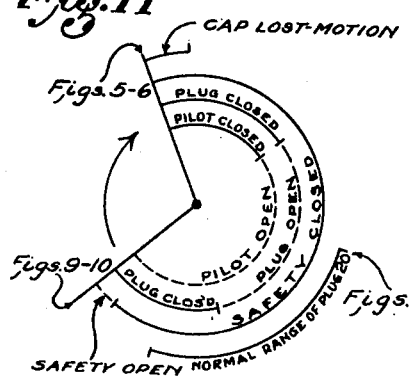
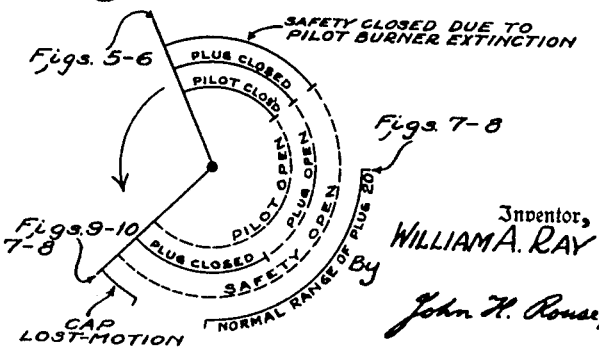
Inventor,
WILLIAM A. RAY
By John H. Rouse,
Attorney Patented July 18, 1944

2,353,759

UNITED STATES PATENT OFFICE 2,353,759

FLUID CONTROL VALVE

William A. Ray, Los Angeles, Calif.

Application September 26, 1941, Serial No. 412,380

2 Claims. (Cl. 277—25)

My present invention relates to fluid control valves and particularly to those of the rotary plug type.

An object of my invention is to provide a novel plug valve whereby fluid flow to a main and a supplemental outlet can be so controlled that in one position of the plug the flow is to the supplemental outlet only, and in another position to both the main and the supplemental outlet.

A plug valve of the type described in the preceding object has particular utility in combination with a "safety" valve of the type wherein a closure member, only manually movable to open position, is maintained in that position by means responsive to a controlling condition—such as that due to the existence of flame at a pilot burner for a main burner—and is released upon extinction of the pilot burner flame, so that it then closes and subsequently must be "manually reset" to open position. When the plug valve is combined with such a safety valve, means are preferably provided whereby the safety valve is reset by the rotation of the plug. It is another object of my invention to provide a combination valve of the character described wherein, when the plug is in safety-valve resetting position, flow through the plug valve to the main outlet—connected, for example, to supply fuel to a main burner—is obstructed, while flow to the supplemental outlet—connected to a pilot burner for the main burner—is permitted; the plug having another position wherein flow to both outlets is permitted, and still another position wherein flow through the combination valve is completely obstructed regardless of the condition of the safety valve.

Other objects and advantages of my invention will be found in the description, the drawings, and the appended claims.

For complete understanding of the invention, reference may be had to the following detailed description and accompanying drawings, wherein:

Figure 3 is a fragmentary view, mainly in section, taken along the irregular line 3—3 of Fig. 1, the parts being shown in positions differing from those of Fig. 1;

Figure 4 is a front elevation of a heating device, showing the valve of Figs. 1-3 connected to supply fuel to the main and the pilot burner of the device;

Figures 5-6, 7-8, and 9-10 are fragmentary transverse sections taken along the center lines of the main and supplemental openings, 22 and 23 respectively, of the valve plug 20, the plug being shown in different angular positions in the several pairs of figures; and Figures 11 and 12 are charts indicating the relative positions of the several valves under different conditions.

Figure 2:
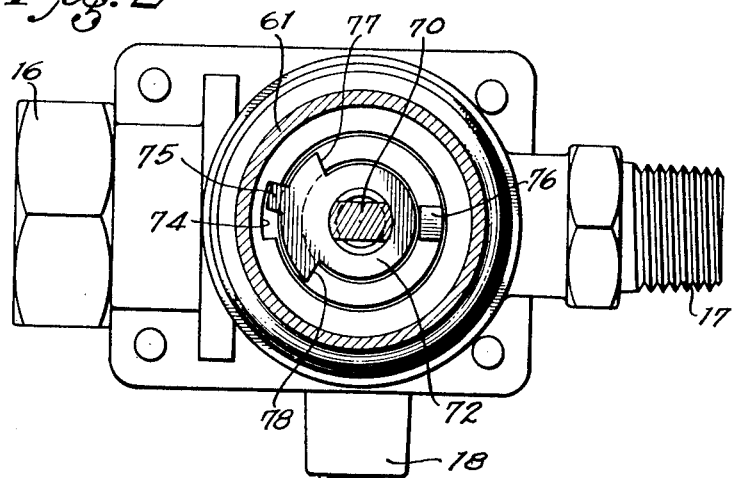
Figure 2 is a plan of the same valve, with the cap 61 broken away along the line 2—2 of Fig. 1.

In the drawings, the numeral 15 indicates a valve casing having an inlet connection 16 and a main and a supplemental outlet connection, 17 and 18 (Fig. 2) respectively. The upper portion of the casing is bored to provide a tapered seat 19 for a correspondingly tapered plug 20. In the bottom of plug 20 is a concentric opening or passage 21, from different upper levels of which branch a main lateral passage 22 and a supplemental lateral passage 23. When the plug is in the angular position shown in Fig. 1, its main passage 22 registers with a passage 24 formed in the casing (Fig. 7) and which connects with the main outlet connection 17. The outer surface of the plug is provided with a groove 25 which intersects the supplemental passage 23 and extends on either side thereof, as is better seen in Figs. 6, 8 and 10. This groove, through a considerable rotation of the plug, is in communication with a passage 26 (Figs. 6, 8 and 10) which connects with the supplemental outlet connection 18.

The portion of the casing surrounding the cylindrical bottom end of the plug seat 19 forms a knife-edged annular valve seat 27, cooperable with which is a closure member 28, in a bore in a base portion 29 of which is the upper end portion of a rod 30 which is secured to the portion 29 by a pin 31. Carried on the bottom end of rod 30 is an armature 32 which is cooperable with an electromagnet, generally indicated at 33, mounted in an inverted cup-shaped housing 34 which covers an opening in the bottom wall of the casing 15.

The electromagnet 33 comprises a U-shaped core 35 which carries on one of its arms an energizing coil 36, the leads of which are connected to a pair of hexagonal terminal posts 37, insulatingly secured in the bottom wall of housing 34. To prevent possible rotation of the posts 37 (and consequent damage to the coil leads) when external electrical connections are made or removed, a disk 38 of insulating material is provided, the disk fitting snugly within the housing 34 and having a pair of hexagonal openings for the posts. The disk 38 rests on the upper insulating washers 39 of the terminal posts and on a punched-in portion 40 of the housing, and also serves to hold in position the core 35, the arms of which extend upwardly through a generally-rectangular central opening therein. A U-shaped metal strap 41 embraces the medial portion of the core and is outwardly bent-over at its ends below the disk 38 to hold the core to the disk.

The disk 38 is held from vertical movement by a pair of opposed cup-shaped shells 42 and 43 which fit snugly within the housing 34, and the interengaging end walls of which are apertured to receive the upper end portions of the core arms. The combined length of the shells when in position is such that the mouth of the upper shell 43 is flush with the flanged top surface of housing 34. The side wall of the opening in the bottom of the valve casing 15 is provided with a shallow cylindrical recess, concentric with the housing 34, for a circular plate 44. The casing opening is lengthened toward the left-hand end of the casing for a bracket 45, soldered or otherwise suitably secured to the enlarged left-hand flange portion of the housing 34, so that the recess for plate 44 is not continuous but extends through about 300°. The abutment of the upper end of shell 43 with the plate 44 (through a sealing gasket 46) serves to hold both the electromagnet and the plate in position when the housing 34 is attached to the casing.

The armature 32 is of rectangular shape and only slightly larger than the area of the pole faces 47 of core 35 and the space between them. Since the nickel-iron alloy, of which the armature is preferably constructed, is expensive and not readily obtainable at this time, there is a worth-while saving of material in providing such an armature in place of one of circular shape. To limit rotation of the armature on rod 30 to a small angle, the armature is transversely slotted at 67 to freely receive the straight-sided portion of the otherwise cylindrical head 48 of rod 30. The portion between the rod and its head is rounded to permit the armature to rock slightly in all directions so that it may conform exactly to the pole faces 47 when it is magnetically held thereto and there is an upward force on rod 30. This is important, since the electromagnet 33 is designed to operate on power only sufficient to magnetically hold the armature, against the force of a bias, after it is first manually brought into engagement with the pole faces, and any slight misalignment of these parts would greatly weaken the holding force. The armature is normally held against the head 48 by the force of a light spring 49 compressed between it and a sleeve 50 which surrounds the medial portion of rod 30 and abuts the lower portion 29 of the closure member 28. This sleeve is slidable in a bushing 51, secured in a central opening in the plate 44, and serves as a lower guide for the rod and the closure member, the latter also being guided at its upper end by a plurality of spaced portions 52 extending from the casing. The spring 49 permits a small amount of longitudinal relative movement of the armature and rod 30, so that the armature can be brought into firm engagement with the pole faces by movement of the rod, without the possibility of damage or distortion of the parts by excessive downward force on the rod.

For moving the closure member 28 away from its seat 27 and simultaneously the armature 32 into engagement with the pole faces 47, a channelled arm 53 is pivotally mounted at one of its ends on the bracket 45; the other end of the arm being bifurcated so that it straddles the closure member portion 29, and being provided with slots for the reception of the projecting opposite ends of the pin 31. A torsion spring 54, connected to the bracket 45 and the arm 53, urges the latter upwardly so that the closure member 28 is normally held on its seat by the force of this spring. For actuating the arm 53, there is provided a rod 55 which is reciprocable in a bore 56 formed in an upper portion of the casing. This bore is enlarged toward its upper end to accommodate a spring 57 surrounding the rod and urging the same upward so that the conical upper surface of the enlarged lower end 58 of the rod is in engagement with the casing adjacent the bottom end of the bore 56, thereby preventing any possible leakage of fluid around the rod when it is in this position. Such leakage, when the rod is in a moved position, is prevented by packing means 59 provided below the spring 57. The rod 55 is so positioned that, in its downward movement, its enlarged portion 58 engages the cross-portion 60 of the channelled arm 53 to actuate the same.

Rotatably mounted on an extreme upper portion of the casing 15 is a hollow cap 61, the undersurface of which is annularly recessed at 62 to provide a clearance space for a ball 63 which rests on the top end of rod 55 in the upper end of the enlargement of bore 56. The cap is mounted for free rotation by means of a plurality of balls 64 which are arranged in cooperating semi-spherical annular grooves formed in the inner side wall of the cap and in the adjacent cylindrical portion of the casing. A plug 65 closes an opening in the cap whereby the balls can be introduced. As is better seen in Fig. 3, a wedge-shaped member or cam 66 is secured in the recess 62 in a position such that, in the rotation of the cap in a clockwise direction as viewed from above, its inclined front end engages the ball 63 and forces it downward, thereby operating the closure member 28 through the agency of rod 55 and arm 53.

The cylindrical upper portion 70 of the plug 20 is reduced in diameter at its upper extremity, this reduced portion being milled to provide opposite flat sides and threaded to receive a nut 71. Held to the plug by this nut is a segment plate 72 having a broached central opening corresponding to the flat-sided portion of the plug; and below the plate, in a recess of the casing around the plug portion 70, is a compression spring 73 which urges the plug upward into firm engagement with its tapered seat 19. The upper inner portion of the cap 61 has a recess 74 (Fig. 2) for receiving a tongue portion 75 of the plate 72. The tongue and its recess are so proportioned that there is about 20° lost-motion between the cap and the plug-driving plate 72, for a purpose hereinafter to be described. Rotation of the plate 72, and hence that of the plug 20, is limited to an angle of about 230° by a stop 76 which extends from the top surface of the casing 15 and is engageable by the segment shoulders 77 and 78. In Fig. 3, a spring-pressed ball 79 is shown (in broken lines) which cooperates with a conical depression in the plug portion 70 to provide slight resistance to rotation of the plug from its full-open position shown in Fig. 1. The general means shown herein, whereby rotation of the cap 61 serves to operate both the plug 20 and the "safety" closure member 28, is disclosed in my copending application, Serial No. 377,274, filed February 4, 1941.

In Fig. 4, the valve described hereinabove, and indicated by the numeral 90, is shown connected to supply gas to the main burner 91 and the pilot burner 92 of a space-heating device 93, the pilot burner also serving to heat a thermoelectric generating device (thermocouple or thermopile) 94 which is connected to energize the electromagnet 33. It will be understood that the main burner is connected to the main outlet connection 17, the pilot burner to the supplemental outlet connection 18, and the source of gas to the inlet connection 16. A thermostatic valve 95, of conventional type and operated in response to change in pressure of the fluid contained in a thermal bulb 96, is shown connected between the valve 90 and the main burner to provide automatic control of the heating device when such control is desired. For the sake of simplicity, in the following description of the operation of valve 90, it will be assumed that the thermostatic valve 95 is continuously open.

*Operation*

Figure 1:
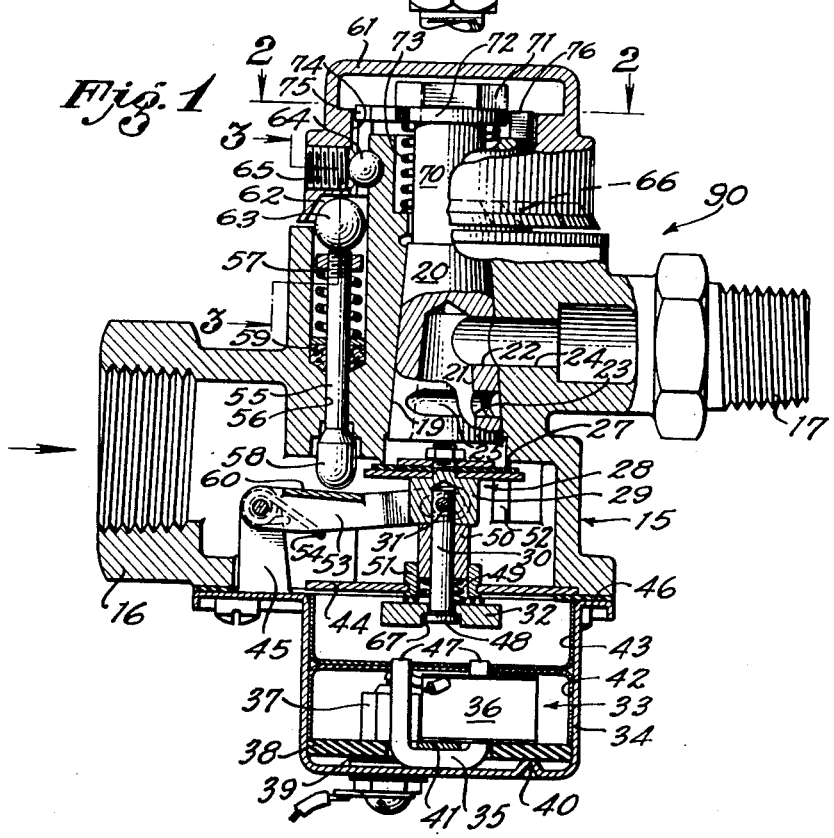
Figure 1 is a view, mainly in vertical section, of a valve embodying my invention.

In Fig. 1 the valve 90 is shown with its parts in the positions which they would assume if, during normal operation of the burner system, the flame of the pilot burner 92 had accidentally been extinguished, thereby causing cessation of current generation by the device 94 and resultant deenergization of the electromagnet 33—i. e., the plug-valve main and supplemental passages 22, 24 and 23, 26, respectively, are in communication (Figs. 7-8), but the closure member 28 is on its seat, so that no gas can pass through the valve. This condition is graphically represented in Fig. 11 at the point indicated by the legend "Figs. 7-8." In the operation charts of Figs. 11 and 12, the legends have been abbreviated: the word "Pilot" indicating the supplemental passages of the plug valve, the word "Plug" indicating the main passages of the same, and the word "Safety" indicating the closure member 28. Since the angular positions shown in these charts are those of the cap 61, corresponding points in the two charts differ angularly by the amount of the lost-motion between the cap and the plug, the rotation being in opposite directions in Fig. 11 and Fig. 12, as is indicated by the arrows.

To reinitiate operation of the burner system, the valve 90 must be "reset." This is accomplished by rotating the cap in a clockwise direction until its rotation is arrested by the engagement of the shoulder 77, of the plate 72, with the stop 76. In this position of the cap, the armature 32 has been brought into contact with the pole faces 47 due to the engagement of cam 66 with the ball 63 and the resultant downward movement of rod 55, arm 53, and the armature-carrying members. The parts are so adjusted that, in this limited position of the cap, the head 49 of rod 30 is out of engagement with the armature, the spring 49 being slightly compressed; so that there is no possibility of manually applying force to the electromagnet sufficient to damage it.

The safety valve or closure member 28 is now in open position, and the plug 20 is in the condition shown in Figs. 9-10 with its main passage 22 closed and its supplemental passage in communication with the supplemental outlet 26 (through the trailing groove 25) as is indicated at "Figs. 9-10" in Fig. 11. Gas can therefore now flow from the inlet 16, past the seat 27, through passages 21, 23, 25 and 26, and supplemental outlet 18, to the pilot burner 92 (only) where it is lighted. The cap is manually retained in this position until the thermoelectric device 94 is sufficiently heated by the pilot burner flame to generate current in an amount sufficient to cause the electromagnet to hold the armature 32 in engagement with its pole faces 47 against the force of spring 54, whereupon the cap may be released. When this occurs, the arm 53 remains in its depressed position but the rod 55 moves upward under the force of spring 57, the resultant rotation of cap 61 producing no material resistance to the movement of rod 55 since the cap (due to the lost-motion between it and the plug) is not now connected to the plug. If such lost-motion were not provided, there would be the dangerous possibility that, due to the relatively great friction between the plug and its seat, the safety valve would be held open even if the electromagnet were not energized.

The plug may now be rotated in a counter-clockwise direction, by means of the cap, to its "full-on" position, as shown in Figs. 7-8, wherein its main passage 22 is in register with the main outlet passage 24, so that gas now passes from the main inlet 16, through the open safety valve, to the main burner 91, where it is ignited by the flame of the pilot burner 92. It will be seen that, in this position of the plug, gas is still supplied to the pilot burner due to the length of groove 25. To manually control fuel supply to the main burner, the plug may now be rotated back and forth between the limits of the "Normal range of plug 20" indicated in Figs. 11 and 12.

In the event of extinction of the pilot burner flame, upon the resultant cessation of current generation by the thermoelectric device, the electromagnet releases the armature and the parts return to their positions as shown in Fig. 1 under the influence of the bias spring 54; fuel flow to both the main and the pilot burner being obstructed by the closed safety valve 28. The valve must then be "manually reset" as described hereinabove.

If it is desired to put the burner system completely out of operation, as during the summer, the plug is rotated in a counterclockwise direction beyond its "normal" range of movement to the position indicated by "Figs. 5-6" in Fig. 12 and wherein the shoulder 78 of plate 72 is in engagement with the stop 76. In this position of the plug, both the main and supplemental outlet passages 24 and 26, respectively, are out of communication with the inlet passage 21, as is shown in Figs. 5-6, so that fuel supply to the main and the pilot burner is obstructed regardless of the condition of the safety valve. However, the pilot burner flame now being extinguished, the safety valve also closes. Since it is not advisable to rely upon a safety valve, of the general type shown, remaining completely leak-proof over a long period of time, the positive shut-off provided by the plug is a highly desirable feature.

While I have herein shown and described a specific embodiment of my invention, I wish it to be understood that modifications may be made without departing from the spirit of the invention, and that I intend therefore to be limited only by the scope of the appended claims.

I claim as my invention:

1. In combination: a rotatable plug; a valve casing having a main and a supplemental outlet passage and a common inlet, and providing a seat for said plug to which said outlet passages extend; said plug having a main and a supplemental passage movable by the rotation of the plug into and out of communication at said seat with said main and supplemental passages respectively; a safety valve in said common inlet and controlling fluid flow to said plug passages; means whereby rotation of said plug, while said main passages are out of communication, effects movement of said safety valve to open position; and means for normally maintaining the safety valve in said open position; said supplemental passages being so oriented with respect to the main passages that the former are in communication when the safety valve is moved to open position; the end of one of said supplemental passages at said seat being so elongated that the supplemental passages are also in communication when the plug is rotated to a position wherein said main passages are in register; the plug being rotatable to another position wherein both the main and the supplemental passages are respectively out of communication so that fluid flow through the casing is then completely obstructed regardless of the condition of the safety valve.

2. In combination: a rotatable plug; a valve casing having a main and a supplemental outlet passage and a common inlet, and providing a seat for said plug to which said outlet passages extend; said plug having a main and a supplemental lateral passage movable by the rotation of the plug into and out of communication at said seat with said outlet passages respectively, said main passages being spaced from said supplemental passages axially of the plug; said plug also having a substantially axial opening interconnecting the plug passages and extending to the inlet end of the plug; a safety valve in said common inlet and controlling fluid flow to said plug opening; means whereby rotation of said plug, while said main passages are out of communication, effects movement of said safety valve to open position; and means for normally maintaining the safety valve in said open position; said supplemental passages being so radially oriented with respect to the main passages that the former are in communication when the safety valve is moved to open position; the end of one of said supplemental passages at said seat being so elongated that the supplemental passages are also in communication when the plug is rotated to a position wherein said main passages are in register; the plug being rotatable to another position wherein both the main and the supplemental passages are respectively out of communication so that fluid flow through the casing is then completely obstructed regardless of the condition of the safety valve.

WILLIAM A. RAY.